Oct. 14, 1941.    L. T. SACHTLEBEN    2,259,395
LENS COATING
Filed July 31, 1940
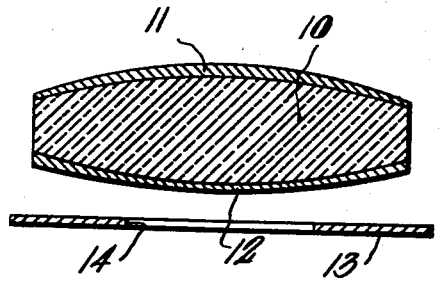
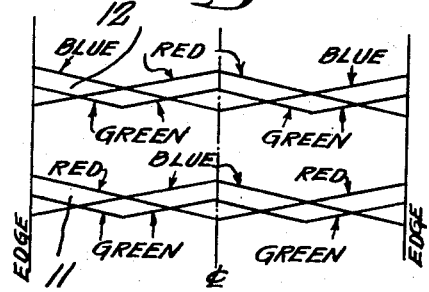
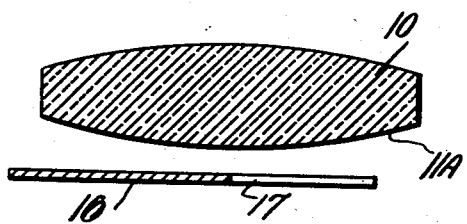
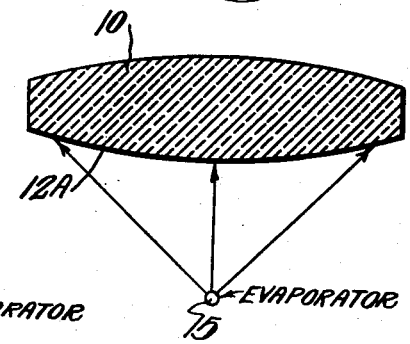
Inventor
Lawrence T. Sachtleben
Attorney Patented Oct. 14, 1941

2,259,395

UNITED STATES PATENT OFFICE 2,259,395

LENS COATING

Lawrence T. Sachtleben, Camden, N. J., assignor to Radio Corporation of America, a corporation of Delaware Application July 31, 1940, Serial No. 348,884

2 Claims. (Cl. 88—1)

This invention relates to the coating of lenses or other optical elements with a layer of transparent material to reduce surface reflection.

The coating of optical elements with a layer of transparent material such as calcium fluoride to a thickness of approximately one-quarter of a wave length of light for which minimum reflection is desired is known in the art, and such coatings are highly useful in reducing the reflection and, therefore, increase the transmission of the light for which the particular thickness of the coating is selected. When a plurality of surfaces in an optical system are so coated, there is a tendency for the system as a whole to become highly color-selective. It has heretofore been proposed to avoid such color-selectivity by making the coatings on different surfaces of different thicknesses, so that the average transmission of the system as a whole becomes uniform. Such an arrangement is subject to the disadvantages that optical elements are not interchangeable between various optical systems and the several elements in themselves are not achromatic so far as transmission is concerned.

The present invention provides a novel method of coating reflection-reducing films and a novel type of such films in which the transmission of any one surface or of the two surfaces of a single optical element may be made substantially achromatic, and this may be accomplished in such a manner as to be effective at all apertures of the lens or optical element.

In the present invention, I provide such a coating on the lens as to produce a minimum reflection of one color at the center of the lens and a minimum reflection of the complementary color at the edge thereof, and, on the opposite surface of the lens or optical element, I provide a surface having a minimum reflection at each of these regions which is complementary to the minimum reflections of the first surface. For example, one surface of the lens will be coated so as to give minimum reflection of red in the center and minimum reflection of blue at the edge, while the opposite surface will be so coated as to give minimum reflection of blue in the center and minimum reflection of red at the edge.

One object of the invention is to provide an improved non-reflecting coating for optical elements.

Another object of the invention is to provide an improved method of applying non-reflecting coatings to optical elements.

Another object of the invention is to provide an improved lens or optical element having maximum average transmission for all colors at all lens apertures.

Other and incidental objects will be apparent to those skilled in the art from a reading of the following specification and an inspection of the accompanying drawing, in which Figure 1 is a sectional view of the lens coated in accordance with my invention, Figure 2 is a diagram illustrating the zonal distribution of reflections from the coatings on opposite surfaces of the optical surfaces of the optical element or lens, Figure 3 is a diagrammatic illustration of a method of applying a coating which is thicker at the center of the optical element than at the edges, and Figures 4 and 5 are, respectively, a section and a plan view illustrating an apparatus and method for applying a coating to an optical element or lens which is thicker at the edges than in the middle.

Referring to Fig. 1, the coating 11 has a thickness in the middle of the lens corresponding to a quarter of a wave length for red light and therefore it has the greatest transmission in the red. The edge of the coating 11, however, has a thickness corresponding to a quarter of a wave length in the blue light and this accordingly will have the greatest transmission in the blue. The intermediate portion will, of course, have a corresponding thickness and will have the greatest transmission in the green gradually merging into red toward the center and the blue toward the periphery. The opposite coating 12, the application of which is illustrated in Figs. 4 and 5, has a thickness in the middle corresponding to a quarter of a wave length of blue light and an edge thickness corresponding to a quarter of a wave length for the red light. It will be apparent from an inspection of Fig. 2, that the optical axis or center line of the lens is vertical and in the middle of the figure. Since the transmission of the one layer is maximum in the red in the center of the lens and that of the other layer is in the blue in the center of the lens these two complementary colors will balance each other and if white light is admitted to this portion of the surface it will emerge from the other surface as white light. Conversely, at the periphery of the lens where the color sequence in the layers is reversed, the light will also remain at its original color. In the intermediate zone which is marked green in the drawing, the maximum transmission corresponds to that of the middle of the spectrum in the yellowish-green and since the red and blue components of the light are equally reflected at this portion, no substantial change in the apparent color of the light will be produced.

Although the form of the invention just described is that which is preferred it will be apparent that the same overall result will be accomplished in an optical system including two or more elements by providing similar coatings on both sides of one of the elements and the complementary coatings on both sides of the other element, as, for example, one element may have maximum transmission for red in the center of the coatings on both sides of the element with a maximum for blue at the periphery, while the other element may have the maximum for blue in the center with the maximum for red at the periphery. Such an arrangement is not preferred, however, as the use of complementary coatings on opposite sides of each optical element renders the elements interchangeable in optical systems without regard for the manner in which the other elements used at the same system are coated.

Fig. 3 illustrates the application of a coating which is thicker in the middle of the lens and thinner at the edges. This particular method depends on the geometry of the evaporating apparatus and the fact that the quantity of material deposited on any particular area varies as the inverse square of the distance between the evaporator and the particular area.

The application of a coating which is thicker at the edge of the lens than at the center is accomplished as shown in Figs. 4 and 5. In this arrangement the evaporator 15 is located adjacent one edge of the lens and the shield or diaphragm 16 is located between the evaporator and the lens surface. The edges of the notch 17 in the shield 16 may be so contoured as to secure any desired distribution of the coating material from the center to the edge of the lens. In the use of this apparatus the lens is rotated at an appropriate speed about its own optical axis above the shield and evaporator during the evaporating process and the coating is thereby made uniform around the axis of the lens. It will be apparent that in the performance of this method the shield 16 may, if desired, be omitted and appropriate distribution of the coating may be obtained by appropriately locating the evaporator 15 in relation to the rotating lens surface but such a procedure does not permit the accuracy of control of the distribution of the coating material which may be accomplished by the use of the shield.

It will be apparent that due to the variation in thickness the coating applied to a single optical surface will provide uniform average spectral transmission. If the coatings are used on a lens system which is always used at full aperture, such, for example, as a motion picture projection lens, the coatings may, if desired, all be similar, that is, thick in the center and thinner at the edges, or vice versa, and uniform transmission for all colors of the spectrum will be secured. If, on the other hand, the optical surface is to be used in conjunction with a variable diaphragm or other means for changing the effective aperture, then the coatings should be of complementary thicknesses so that the light transmission will remain substantially uniform for all colors irrespective of the diaphragm opening.

Having now described my invention, I claim:

1. In combination, an optical element and a transparent non-reflecting coating on the surface thereof, said coating varying in thickness from the center to the edges in such relation to the wave length of light to be transmitted as to transmit a preponderance of one color in the middle of the surface and a preponderance of the complementary color at the edges.

2. In combination, an optical element, a transparent reflection reducing coating of a thickness varying from the center to the edge on one surface of said element for its highest transmission for one color in the middle of said surface and its highest transmission for the complementary color adjacent the periphery of said surface, and a second coating on the opposite surface of said element, said second coating having its highest transmission for the said complementary color at the middle of its surface and its highest transmission for the first of said colors adjacent the periphery of the surface.

LAWRENCE T. SACHTLEBEN.